(12) United States Patent
Tamura et al.

(10) Patent No.: US 11,055,357 B2
(45) Date of Patent: Jul. 6, 2021

(54) COMPUTER, DATA ELEMENT PRESENTATION METHOD, AND PROGRAM

(71) Applicant: FRONTEO, Inc., Tokyo (JP)

(72) Inventors: Ryota Tamura, Tokyo (JP); Shinya Iguchi, Tokyo (JP)

(73) Assignee: FRONTEO, Inc., Tokyo (JP)

( * ) Notice: Subject to any disclaimer, the term of this patent is extended or adjusted under 35 U.S.C. 154(b) by 92 days.

(21) Appl. No.: 16/590,524

(22) Filed: Oct. 2, 2019

(65) Prior Publication Data

US 2020/0110780 A1 Apr. 9, 2020

(30) Foreign Application Priority Data

Oct. 4, 2018 (JP) .............................. JP2018-189371

(51) Int. Cl.
*G06F 16/00* (2019.01)
*G06F 16/903* (2019.01)
*G06F 16/9035* (2019.01)
*G06F 16/9038* (2019.01)
*G06F 40/268* (2020.01)

(52) U.S. Cl.
CPC .... *G06F 16/90348* (2019.01); *G06F 16/9035* (2019.01); *G06F 16/9038* (2019.01); *G06F 40/268* (2020.01)

(58) Field of Classification Search
CPC ................................................. G06F 16/9038
See application file for complete search history.

(56) References Cited

U.S. PATENT DOCUMENTS 8,972,396 B1 *  3/2015  Zhang ................... G06F 16/951
                                                               707/731
2015/0199427 A1  7/2015  Miyabe

FOREIGN PATENT DOCUMENTS

WO        2014049708 A1    4/2014

* cited by examiner

*Primary Examiner* — Ajith Jacob
(74) *Attorney, Agent, or Firm* — Brundidge & Stanger, P.C.

(57) ABSTRACT

An object is to efficiently generate a list of data elements that complement a given key element. A computer includes a memory and a controller, wherein the memory stores data, and the controller performs: selection processing of selecting data elements in vicinity of a predetermined data element as cooccurrence data elements; calculation processing of calculating a degree of importance of each cooccurrence data element; and presentation processing of presenting the cooccurrence data elements.

9 Claims, 6 Drawing Sheets

[Fig. 1]
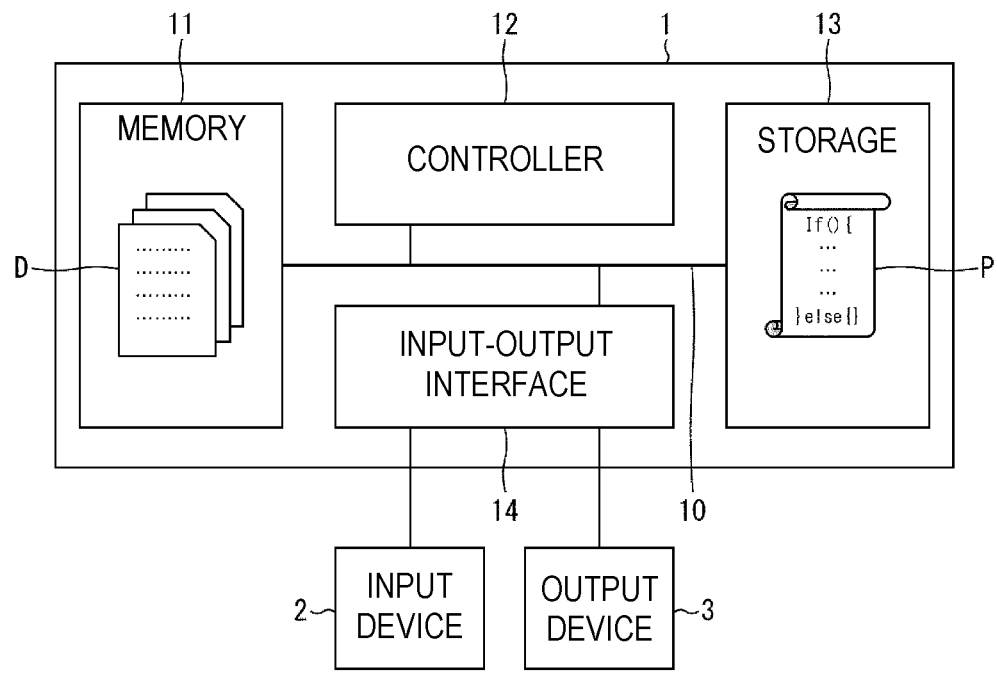

[Fig. 2]
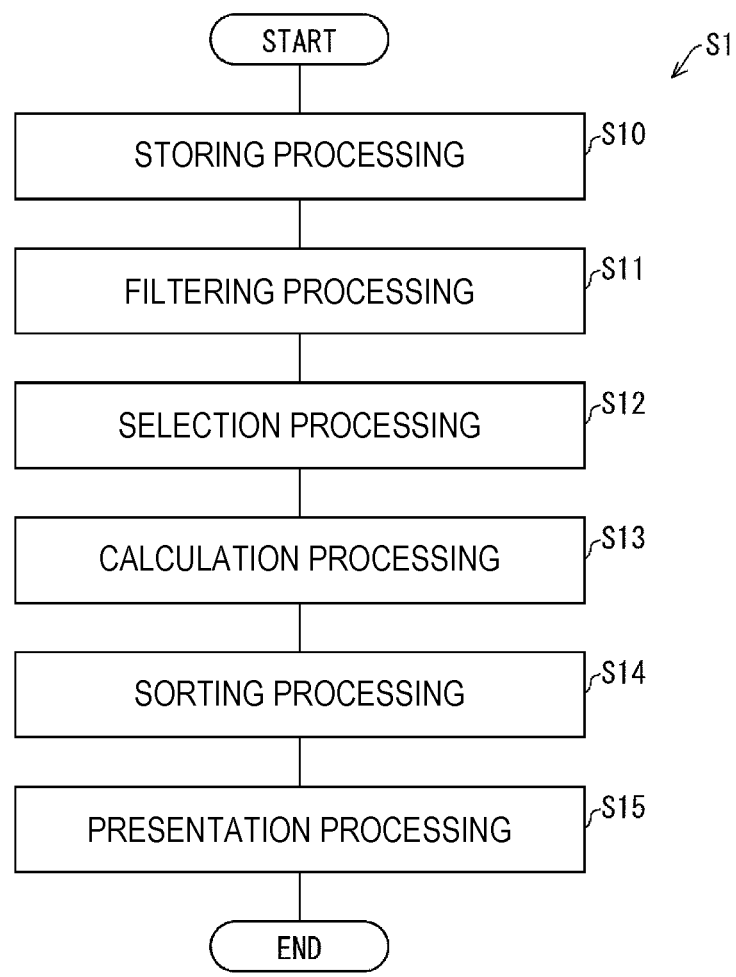

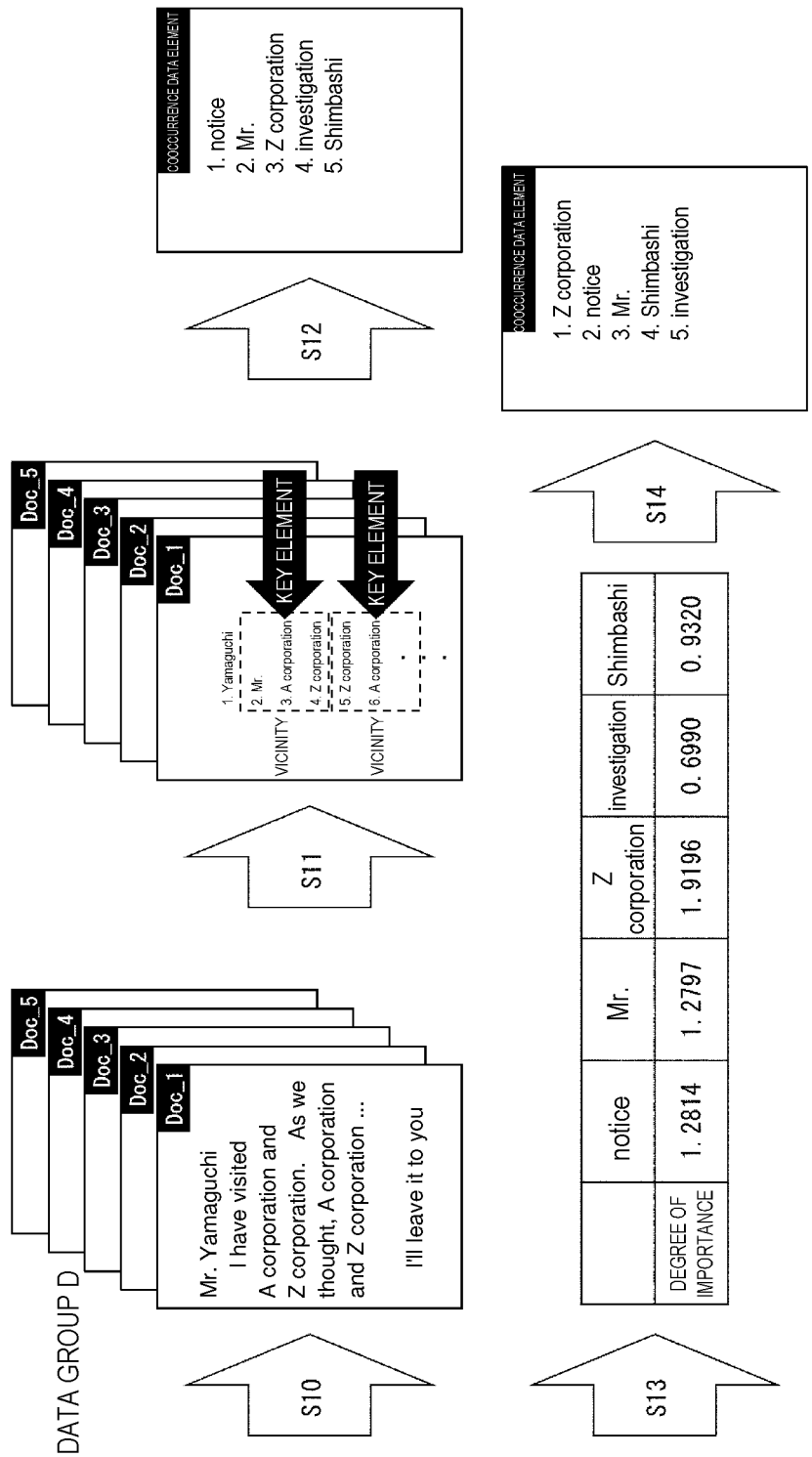

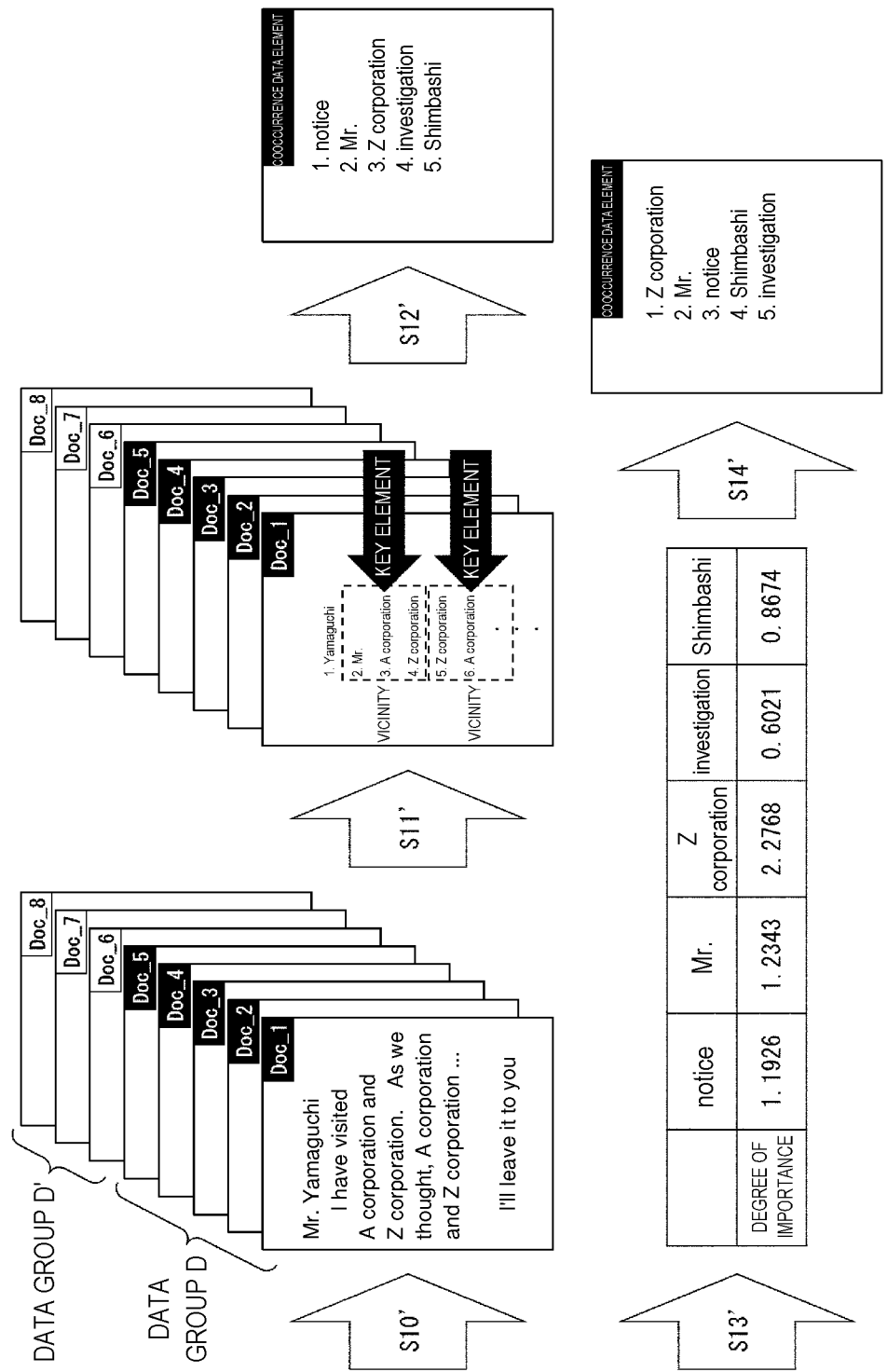
[Fig. 4]

[Fig. 5A]
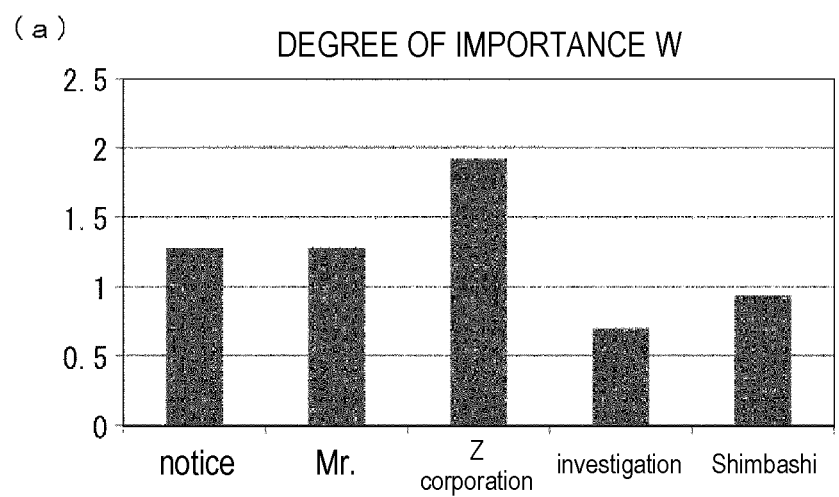

[Fig. 5B]
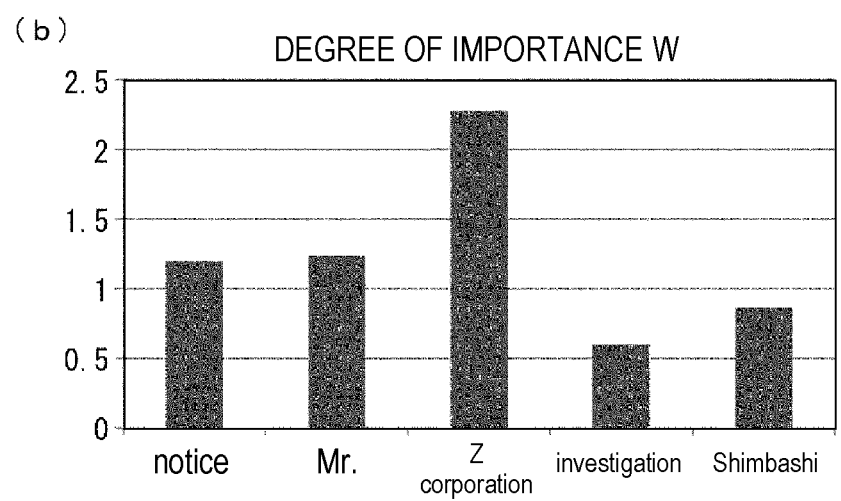

//COMPUTER, DATA ELEMENT PRESENTATION METHOD, AND PROGRAM

BACKGROUND OF THE INVENTION

Field of the Invention

The disclosure relates to a computer comprising a memory and a controller.

Description of the Related Art

In pickup work of finding data that meets a specific extraction condition from among a large amount of data (for example, text data), first screening by a computer and second screening by a human being (hereinafter, referred to as the "reviewer") are often required. In the first screening, data including a data element related to the extraction condition (hereinafter, referred to as the "key element") is extracted by the computer from among the large amount of data. In the second screening, data that meets the condition is extracted by the reviewer from among the data extracted by the computer. For example, work of finding data to be submitted to a court for discovery from among a large amount of data held by a company is an example of such pickup work (see International Publication No. WO 2014/049708).

The key element used in the first screening is, in general, heuristically selected based on sample data taken out of the large amount of data. Accordingly, a problem often arises that the data that meets the extraction condition is absent from the data subject to the second screening due to deficiency of the key element used in the first screening and consequently accuracy in the pickup work decreases. To avoid such a problem, a technique of efficiently compensating for the deficiency of the key element used in the first screening, for example, a technique of presenting data elements that complement a given key element, is required.

The disclosure has been made in light of the above-described problem, and an embodiment of the disclosure implements the technique of presenting data elements that complement a given key element.

SUMMARY OF THE INVENTION

To solve the above-described problem, a computer according to an embodiment of the present disclosure is a computer including a memory and a controller, wherein the memory stores sets of data including a plurality of sets of data, and the controller performs: selection processing of selecting, as a cooccurrence data element or cooccurrence data elements, at least one data element existing in vicinity of a predetermined data element in each set of data included in the sets of data; calculation processing of calculating a degree of importance of each cooccurrence data element selected in the selection processing, based on the number of appearances of the cooccurrence data element in each set of data included in the sets of data; and presentation processing of presenting, to a user, the cooccurrence data elements selected in the selection processing, according to the degrees of importance calculated in the calculation processing.

According to the embodiment of the disclosure, it is possible to present data elements that complement a given key element.

BRIEF DESCRIPTION OF THE DRAWINGS

FIG. 1 is a block diagram showing a configuration of a computer according to an embodiment of the disclosure;

FIG. 2 is a flowchart showing a flow of a data element presentation method according to the embodiment of the disclosure;

FIG. 3 shows a specific example of the data element presentation method shown in FIG. 2;

FIG. 4 shows a modification example of the data element presentation method shown in FIG. 2;

FIG. 5A is a graph showing degrees of importance of individual cooccurrence data elements calculated in the data element presentation method shown in FIG. 3; and FIG. 5B is a graph showing degrees of importance of the individual cooccurrence data elements calculated in the data element presentation method shown in FIG. 4.

DETAILED DESCRIPTION OF THE PREFERRED EMBODIMENTS (Configuration of Computer)

A configuration of a computer 1 according to an embodiment of the disclosure will be described with reference to FIG. 1. FIG. 1 is a block diagram showing the configuration of the computer 1.

The computer 1, as shown in FIG. 1, includes one or more memories 11, one or more controllers 12, a storage 13, and an input-output interface 14, which are connected to each other through a bus 10. For the memory 11, for example, a semiconductor RAM (random access memory) is used. For the controller 12, for example, a CPU (Central Processing Unit) is used. For the storage 13, for example, an HDD (Hard Disk Drive) is used. For the input-output interface 14, for example, a USB (Universal Serial Bus) interface is used.

For example, an input device 2 and an output device 3 are connected to the input-output interface 14. For the input device 2, for example, a keyboard and a mouse are used. For the output device 3, for example, a display and a printer are used. Note that the computer 1, like a laptop computer, may include an integrated keyboard functioning as the input device 2 and an integrated display functioning as the output device 3. The computer 1, like a smartphone or a tablet computer, may include an integrated touch panel functioning as the input device 2 and the output device 3. Further, the computer 1, the input device 2, and the output device 3 may be integrally configured as one unit, or may be separated from each other as discrete devices.

A program P for causing the computer 1 to execute a data element presentation method S1, which will be described later, is stored in the storage 13. The controller 12 expands the program P stored in the storage 13 on the memory 11 and executes each instruction included in the program P expanded on the memory 11, thereby executing each step included in the data element presentation method S1 described later. Moreover, sets of data D including sets of data to be referred to by the computer 1 in the data element presentation method S1 described later is stored in the storage 13. The controller 12 expands each set of data included in the sets of data stored in the storage 13 on the memory 11 and refers to the set of data in each step included in the data element presentation method S1 described later.

Note that although a scenario in which the computer 1 executes the data element presentation method S1 described later by using the program P stored in the storage 13, which is an internal storage medium, is described, the present embodiment is not limited to such a scenario. That is, another scenario may be adopted in which the computer 1 executes the data element presentation method S1 described later by using the program P stored in an external recording medium. In such a case, for the external recording medium, a "non-transient tangible medium" that is readable by the computer 1, for example, a tape, a disk, a card, a semiconductor memory, a programmable logic circuit, or the like can be used. Alternatively, a scenario may also be adopted in which the computer 1 executes the data element presentation method S1 described later by using the program P acquired via a communication network. In such a case, for the communication network, for example, the Internet, a LAN, or the like can be used.

(Flow of Data Element Presentation Method)

Next, the data element presentation method S1 executed by the computer 1 will be described with reference to FIG. 2. FIG. 2 is a flowchart showing a flow of the data element presentation method S1.

The data element presentation method S1 is a method of presenting data elements that complement a given key element, based on the sets of data D including the sets of data that meet a specific extraction condition. The data element presentation method S1, as shown in FIG. 2, includes storing processing S10, filtering processing S11, selection processing S12, calculation processing S13, sorting processing S14, and presentation processing S15.

The storing processing S10 is processing of storing the sets of data D in the memory 11 of the computer 1. The storing processing S10 is performed by the controller 12 of the computer 1.

Each set of data included in the sets of data D is a string of data elements. In the present embodiment, a text set of data including a string of morphemes is mainly assumed as each set of data included in the sets of data D. For text data, for example, TXT data (plain text data), RTF data (rich text data), PDF data, DOC data, and EML data can be recited. A description language for the text data is not specifically limited. For example, the description language may be Japanese, English, or any other language, or any of such languages may be mixed. Character/letter types of characters and letters included in the text data are not specifically limited. For example, Chinese characters, numbers, alphabetical letters, Japanese hiragana characters, Japanese katakana characters, and the like can be recited.

The filtering processing S11 is processing of eliminating predetermined data elements that are deemed unlikely to be key elements, from each set of data included in the sets of data D. The filtering processing S11 is performed by the controller 12 of the computer 1.

If each set of data included in the sets of data D is a text set of data, for example, morphemes other than proper nouns, numbers, alphabetical letters (only provisional nouns), and unknown words are eliminated from each text set of data in the filtering processing S11. In such a case, each text set of data subjected to the filtering processing S11 becomes a string of proper nouns, numbers, alphabetical letters, and unknown words. For example, if a text set of data is "Closed-day/on/Saturdays/and/holidays/./Opening/time/on/Sundays/is/10/o'clock/.", the text set of data subjected to the filtering processing S11 becomes "closed-day/Saturdays/holidays/open/time/Sundays/10/o'clock".

Note that a publicly known morphological analysis engine can be applied to morphological analysis used in the filtering processing S11. The morphological analysis may be performed by the controller 12 of the same computer 1 that performs the filtering processing S11, or may be performed by a different computer from the computer 1.

The selection processing S12 is processing of selecting, as a cooccurrence data element or cooccurrence data elements, a data element or data elements existing in vicinity of a data element given as a key element in each set of data subjected to the filtering processing S11. The selection processing S12 is performed by the controller 12 of the computer 1 after the filtering processing S11 is performed.

Here, data elements existing in the vicinity may be, for example, data elements falling within a distance that is not longer than a predetermined threshold value from the key element. A distance between two data elements is defined by, for example, a natural number obtained by adding 1 to the number of data elements existing between the two data elements. For example, if a text set of data subjected to the filtering processing S11 is "closed-day/Saturdays/holidays/open/time/Sundays/10/o'clock", the distance between "closed-day" and "Saturdays" is 1, and the distance between "closed-day" and "holidays" is 2. Moreover, for example, if the threshold value defining the vicinity is 1, a morpheme in vicinity of "closed-day" is "Saturdays", and morphemes in vicinity of "Saturdays" are "closed-day" and "holidays".

The calculation processing S13 is processing of calculating a degree of importance of each cooccurrence data element selected in the selection processing S12, based on the number of appearances of the cooccurrence data element in each set of data included in the sets of data D. The calculation processing S13 is performed by the controller 12 of the computer 1 after the selection processing S12 is performed.

The calculation processing S13 is implemented, for example, through processing (a) to (c) described below.

Processing (a): The controller 12 counts the number of appearances $n_{s,d}$, in each set of data d included in the sets of data D, of each cooccurrence data element t selected in the selection processing S12. Note that, assuming that the number of the sets of data included in the sets of data D is N and the number of the cooccurrence data elements selected in the selection processing S12 is M, the number of appearances $n_{s,d}$ is represented by a matrix with N rows and M columns. Hereinafter, such a matrix is also referred to as a "cooccurrence matrix".

Processing (b): The controller 12 calculates the frequency of appearances tf(t, d), in each set of data d included in the sets of data D, of each cooccurrence data element t selected in the selection processing S12. The frequency of appearances tf(t, d) is defined by an equation (1) below. Here, $\Sigma_{s \in d} n_{s,d}$ represents the total number of appearances of a cooccurrence data element in a set of data d.

[Expression 1]

$$tf(t, d) = \frac{n_{t,d}}{\sum_{s \in d} n_{s,d}} \quad (1)$$

Processing (c): For each cooccurrence data element t selected in the selection processing S12, the controller 12 counts the number of sets of data df(t) including the cooccurrence data element, among the sets of data included in the sets of data D.

Processing (d): The controller 12 calculates a degree of importance W(t) of each cooccurrence data element t selected in the selection processing S12, based on the frequency of appearances tf(t, d) calculated in the processing (b) and the number of sets of data df(t) calculated in the processing (c).

It is preferable that the degree of importance W(t) calculated in the processing (d) becomes larger as the frequency of appearances tf(t, d) calculated in the processing (b) increases and becomes smaller as the number of sets of data df(t) calculated in the processing (c) increases. For the degree of importance W(t) that meets such a condition, for example, a sum of TF·IDF(t, d), $\Sigma_{d \in D}$ TF·IDF(t, d), defined by equations (2) and (3) below can be recited.

[Expression 2]

$$idf(t) = \log \frac{N}{df(t)} + 1 \qquad (2)$$

[Expression 3]

$$TF \cdot IDF(t, d) = tf(t, d) \times idf(t) \qquad (3)$$

The sorting processing S14 is processing of sorting the cooccurrence data elements selected in the selection processing S12 in order according to the degrees of importance W(t) calculated in the calculation processing S13. The sorting processing S14 is performed by the controller 12 of the computer 1 after the above-described calculation processing S13 is performed. In such a case, the controller 12 may sort the list in descending order of the degrees of importance W(t) calculated in the calculation processing S13 and thus generate a list of the sorted cooccurrence data elements. The list of the sorted cooccurrence data elements is, for example, a list of data elements that complement the given key element, arranged in order of the degrees of importance.

The presentation processing S15 is processing of presenting, to a user, the cooccurrence data elements selected in the selection processing S12 according to the degrees of importance W(t) calculated in the calculation processing S13. For example, the cooccurrence data elements sorted according to the degrees of importance through the sorting processing S14 are presented. That is, the presentation processing S15 is also processing of presenting the list of the sorted cooccurrence data elements to a user. Note that in the presentation processing S15, all of the cooccurrence data elements selected in the selection processing S12 or the entire list of the sorted cooccurrence data elements is not necessarily presented. Part of the cooccurrence data elements are presented in some cases. Note that, as an example, the presentation processing S15 is performed by the controller 12 of the computer 1 after the sorting processing S14 is performed.

For example, the controller 12 outputs the list of the cooccurrence data elements sorted in the sorting processing S14 from the output device 3 via the input-output interface 14. For example, when the output device 3 is a display, the list displayed on the display is presented to the user. Alternatively, when the output device 3 is a printer, the list printed on paper by the printer is presented to the user.

By executing the data element presentation method S1 as described above, the computer 1 can arrange and make a list of the data elements that can complement the given key element in order of the degrees of importance, and present the list to the user. Thus, the user can have the computer perform the first screening for extracting data that meets the predetermined extraction condition, in a state where the data elements included in the list are added as new key elements. Accordingly, since the computer 1 can reduce a risk of absence of the data that meets the extraction condition in the first screening, accuracy in the pickup work of finding the data that meets the extraction condition can be increased.

By executing the data element presentation method S1 as described above, the computer 1 can present to the user the cooccurrence data elements that cooccur with the given key element in the sets of data D, according to the degrees of importance of the cooccurrence data elements as data elements that complement the given key element. To be more specific, the computer 1 can arrange and make a list of the cooccurrence data elements that cooccur with the given key element in the sets of data D in order of the degrees of importance of the cooccurrence data elements as data elements that complement the given key element, and present the list to the user. Thus, using the given key element and the data elements included in the list as new key elements, the user can have the computer perform the first screening for extracting the data that meets the extraction condition. Thus, the computer 1 can perform the first screening with higher accuracy (at a lower risk of absence of the data that meets the extraction condition from an extraction result) than when only the given key element is used. As a result, accuracy in the pickup work of finding the data that meets the extraction condition can be increased.

Here, as the first screening, the controller 12 of the computer 1 may perform (1) extraction processing (processing of extracting data including key elements) in which the given key element and all of the data elements included in the list are used for new key elements, or (2) extraction processing in which the given key element and part of the data elements included in the list are used for new key elements. If the scenario (2) is adopted, the data elements used for new key elements may be (2a) data elements selected from the list by the user, or (2b) data selected from the list by the computer 1 based on the degrees of importance. If the scenario (2a) is adopted, the controller 12 of the computer 1, for example, performs reception processing of receiving a user operation for selecting data elements to be used for new key elements from among the data elements included in the list. If the scenario (2b) is adopted, the controller 12 of the computer 1, for example, performs selection processing of selecting a predetermined number of data elements in descending order of the degrees of importance from among the data elements included in the list. Note that a population subject to the first screening may be the sets of data D, or may be other sets of data (a set of data) than the sets of data D. The first screening may be screening for which the number of sets of data to be extracted is predetermined, or may be screening for which the number of sets of data to be extracted is not predetermined.

Note that it is presumed that any products and services having the above-mentioned advantageous effect as a result of presenting data elements that can complement a key element to a user include part or all of the components included in the computer 1 according to the present embodiment.

(Specific Example of Data Element Presentation Method)

A specific example of the data element presentation method S1 will be described with reference to FIG. 3. Here, a description will be given of a method in which a list of morphemes (data elements) that complement a key word (key element) "A corporation" is generated when in the storing processing S10, the sets of data D including five text sets of data Doc_1 to Doc_5 is stored in the memory 11.

In the filtering processing S11, morphemes other than proper nouns, numbers, alphabetical letters, and unknown words are eliminated from each text set of data d (d=Doc_1, Doc_2, Doc_3, Doc_4, Doc_5). FIG. 3 illustrates the text set of data Doc_1 from which such morphemes are eliminated, with morphemes "Yamaguchi", "Mr.", "A corporation", "Z corporation", "Z corporation", "A corporation", . . . remaining. Note that in FIG. 3, all text sets of data included in the sets of data D are subject to the filtering processing S11, but the present example is not limited to such a scenario. For example, only text sets of data including the morpheme "A corporation" among the text sets of data included in the sets of data D may be subject to the filtering processing S11.

In the selection processing S12, morphemes existing in vicinity of the key word "A corporation" in each text set of data d subjected to the filtering processing S11 are selected as cooccurrence data elements. FIG. 3 shows that in the text set of data Doc_1 subjected to the filtering processing S11, the morphemes "Mr." and "Z corporation" existing in vicinity of the key word "A corporation" are selected as cooccurrence data elements. In FIG. 3, other cooccurrence data elements than "Mr." and "Z corporation" are cooccurrence data elements selected from the other text sets of data than the text set of data Doc_1. Note that in the present specific example, a morpheme at a distance of 1 or shorter from the key word "A corporation" is defined as a morpheme existing in vicinity of the key word "A corporation".

In the calculation processing S13, the degree of importance W(t) of each cooccurrence data element t (t="notice", "Mr.", "Z corporation", "investigation", "Shimbashi") selected in the selection processing S12 is calculated based on the number of appearances $n_{s,d}$ of each cooccurrence data element t in each text set of data d.

The calculation processing S13 is performed as follows.

First, for each cooccurrence data element t selected in the selection processing S12, the number of appearances $n_{s,d}$ in each text set of data d included in the sets of data D is counted. Here, it is assumed that the numbers of appearances $n_{s,d}$ shown in Table 1 below are obtained. Hereinafter, the number of appearances $n_{s,d}$ viewed as a matrix with five rows and five columns will be referred to as a cooccurrence matrix $n_{s,d}$.

TABLE 1

Cooccurrence matrix $n_{s,d}$

| | notice | Mr. | Z corporation | investigation | Shimbashi |
|---|---|---|---|---|---|
| Doc_1 | 0 | 1 | 2 | 0 | 0 |
| Doc_2 | 1 | 1 | 1 | 1 | 2 |
| Doc_3 | 0 | 1 | 2 | 0 | 0 |
| Doc_4 | 0 | 1 | 0 | 1 | 1 |
| Doc_5 | 3 | 0 | 1 | 0 | 0 |

Next, for each cooccurrence data element t selected in the selection processing S12, tf(t, d) in each text set of data d included in the sets of data D is calculated in accordance with the above-mentioned equation (1). If the cooccurrence matrix $n_{s,d}$ is as in Table 1 above, tf(t, d) is calculated as in Table 2 below. For example, the total number of appearances of the cooccurrence data elements in the text set of data Doc_1 is 3 (1 appearance of "Mr." and 2 appearances of "Z corporation"), and the number of appearances $n_{Z\ corporation,\ Doc\_1}$ of the cooccurrence data element "Z corporation" in the text set of data Doc_1 is 2. Accordingly, tf(Z corporation, Doc_1) is ⅔.

TABLE 2 tf(t, d)

| | notice | Mr. | Z corporation | investigation | Shimbashi |
|---|---|---|---|---|---|
| Doc_1 | 0 | 1/3 | 2/3 | 0 | 0 |
| Doc_2 | 1/6 | 1/6 | 1/6 | 1/69 | 1/3 |

TABLE 2-continued tf(t, d)

| | notice | Mr. | Z corporation | investigation | Shimbashi |
|---|---|---|---|---|---|
| Doc_3 | 0 | 1/3 | 2/3 | 0 | 0 |
| Doc_4 | 0 | 1/3 | 0 | 1/3 | 1/3 |
| Doc_5 | 3/4 | 0 | 1/4 | 0 | 0 |

Next, for each cooccurrence data element t selected in the selection processing S12, df(t) is counted. As described above, df(t) is the number of text sets of data including a cooccurrence data element t among the text sets of data Doc_1 to Doc_5 included in the sets of data D. If the cooccurrence matrix $n_{s,d}$ is as in Table 1 above, df(t) is counted as in Table 3 below. For example, text sets of data including the cooccurrence data element "Z corporation" are the text set of data Doc_1, the text set of data Doc_2, the text data Doc_3, and the text data Doc_5, in a total of 4 text sets of data. Accordingly, df(Z corporation) is 4.

TABLE 3 df(t)

| | notice | Mr. | Z corporation | investigation | Shimbashi |
|---|---|---|---|---|---|
| df(t) | 2 | 4 | 4 | 2 | 2 |

Next, for each cooccurrence data element t selected in the selection processing S12, idf(t) is calculated in accordance with the above-mentioned equation (2). If the cooccurrence matrix $n_{s,d}$ is as in Table 1 above, idf(t) is calculated as in Table 4 below. For example, the text sets of data included in the sets of data D are the text set of data Doc_1, the text set of data Doc_2, the text set of data Doc_3, the text set of data Doc_4, and the text set of data Doc_5, in a total of 5 text sets of data, and df(Z corporation) is 4. Accordingly, idf(Z corporation) is log(5/4)+1≈1.097.

TABLE 4 idf(t)

| | notice | Mr. | Z corporation | investigation | Shimbashi |
|---|---|---|---|---|---|
| idf(t) | 1.398 | 1.097 | 1.097 | 1.398 | 1.398 |

Next, for each cooccurrence data element t selected in the selection processing S12, TF·IDF(t, d) in each text set of data d is calculated in accordance with the above-mentioned equation (3). If the cooccurrence matrix $n_{s,d}$ is as in Table 1 above, TF·IDF(t, d) is calculated as in Table 5 below. For example, tf(Z corporation, Doc_1) is ⅔, and idf(Z corporation) is 1.097. Accordingly, TF·IDF(Z corporation, Doc_1) is ⅔×1.097≈0.7313.

TABLE 5

TF·IDF(t, d)

| | notice | Mr. | Z corporation | investigation | Shimbashi |
|---|---|---|---|---|---|
| Doc_1 | 0.0000 | 0.3656 | 0.7313 | 0.0000 | 0.0000 |
| Doc_2 | 0.2330 | 0.1828 | 0.1828 | 0.2330 | 0.4660 |

TABLE 5-continued

| | | | TF·IDF(t, d) | | |
|---|---|---|---|---|---|
| | notice | Mr. | Z corporation | investigation | Shimbashi |
| Doc_3 | 0.0000 | 0.3656 | 0.7313 | 0.0000 | 0.0000 |
| Doc_4 | 0.0000 | 0.3656 | 0.0000 | 0.4660 | 0.4660 |
| Doc_5 | 1.0485 | 0.0000 | 0.2742 | 0.0000 | 0.0000 |

Lastly, for each cooccurrence data element t selected in the selection processing S12, the degree of importance W(t) is calculated. As described above, the degree of importance W(t) is defined by, for example, the sum of TF·IDF(t, d), $\Sigma_{d \in D}$ TF·IDF(t, d). If the cooccurrence matrix $n_{s, d}$ is as in Table 1 above, the degrees of importance W(t) are calculated as in Table 6 below. For example, TF·IDF(Z corporation, Doc_1) is 0.7313, TF·IDF(Z corporation, Doc_2) is 0.1828, TF·IDF(Z corporation, Doc_3) is 0.7313, TF·IDF (Z corporation, Doc_4) is 0, and TF·IDF (Z corporation, Doc_5) is 0.2742. Accordingly, the degree of importance W(Z corporation) is 0.7313+0.1828+0.7313+0+0.2742=1.9196.

TABLE 6

| | | | Degree of importance W | | |
|---|---|---|---|---|---|
| | notice | Mr. | Z corporation | investigation | Shimbashi |
| Degree of importance | 1.2814 | 1.2797 | 1.9196 | 0.6990 | 0.9320 |

In the sorting processing S14, a list of the cooccurrence data elements {notice, Mr., Z corporation, investigation, Shimbashi} selected in the selection processing S12 is sorted in order according to the degrees of importance W(t) calculated in the calculation processing S13. If the degrees of importance W(t) are as in Table 6 above, a list of the cooccurrence data elements sorted in order according to the degrees of importance W(t) is {Z corporation, notice, Mr., Shimbashi, investigation}. At the time, in the presentation processing S15, for example, only "Z corporation" may be presented to the user, or all of the cooccurrence data elements included in the list may be presented to the user.

(Vicinity of Data Element)

In the present embodiment, it is assumed that data to be referred to by the computer 1 to execute the data element presentation method S1 is a string of data elements. Under such an assumption, in the present embodiment, the distance between two data elements is defined based on the number of data elements interposed between the two data elements in such a string, and the vicinity of a key element is defined based on such a distance. However, the vicinity of a data element is not restrictively defined within a string of data elements in a one-dimensional array.

For example, if a set of data is a text set of data including a plurality of rows, the vicinity of a data element can also be defined as a set of data elements adjacent to the data element at left, right, top, and bottom of the data element. That is, for example, a morpheme that is included in a first row preceding a row including the data element and is included in an approximately same column (the data element adjacent at top), a morpheme that is included in a first row following the row including the data element and is included in the approximately same column (the data element adjacent at bottom), and morphemes that are included in the same row as the row including the data element and are included in columns at a distance of 1 (the data elements adjacent at right and left) may be deemed as the vicinity of the data element.

Further, the vicinity of a data element is not restrictively defined based on a physical distance in a data structure. That is, for the vicinity of a data element, for example, different data may be defined as being conceptually close. For example, if a certain set of data includes text "as a result of consultation with A corporation about the matter" and another set of data includes text "after discussion with B corporation about the matter", "A corporation" and "B corporation" are conceptually close in a point of "having talked about a matter". That is, as mentioned above, since a context of "A corporation" and a context of "B corporation" are approximately identical although the physical distance in a data structure is not short, "A corporation" and "B corporation" can be said to be in "vicinity". To analyze a context, for example, parsing (dependency parsing) may be performed in the filtering processing S11.

For example, data to be referred to by the computer 1 to execute the data element presentation method according to the disclosure may be spreadsheet data such as XLS data. In spreadsheet data, a plurality of cells are arranged in a matrix form within a sheet. For example, assuming that a location of one of two cells is i-row, j-column and a location of the other cell is i'-row, j'-column, a distance $\Delta$ between the two cells can be defined by $\Delta = \{(i-i')^2 + (j-j')^2\}^{1/2}$. Accordingly, a data element included in a cell at the distance $\Delta$ that is not longer than a predetermined threshold value from a cell including a key element is deemed as a data element existing in vicinity of the key element, whereby the above-described data element presentation method S1 can be applied. In spreadsheet data in which each cell includes a text set of data (a string of morphemes), a morpheme at a distance (for example, the number of morphemes interposed between the morpheme and a key element+1) that is not longer than a predetermined threshold value from the key element, among morphemes included in the same cell that includes the key element, may be deemed as a data element existing in vicinity of the key element.

Alternatively, data to be referred to by the computer 1 to execute the data element presentation method according to the disclosure may be presentation data such as PPT data. In presentation data, a plurality of text boxes are freely arranged within a slide. For example, assuming that central coordinates of one of two text boxes is (x, y) and central coordinates of the other text box is (x', y'), a distance $\Delta$ between the two text boxes can be defined by $\Delta = \{(x-x')^2 + (y-y')^2\}^{1/2}$. Accordingly, a data element included in a text box at the distance $\Delta$ that is not longer than a predetermined threshold value from a text box including a key element is deemed as a data element existing in vicinity of the key element, whereby the above-described data element presentation method S1 can be applied. In presentation data in which each text box includes a text set of data (a string of morphemes), a morpheme at a distance (the number of morphemes interposed between the morpheme and a key element+1) that is not longer than a predetermined threshold value from the key element, among morphemes included in the same text box that includes the key element, may be deemed as a data element existing in vicinity of the key element.

As described above, the "vicinity of a data element" can be variously defined. That is, the above-described definitions are merely examples, and all modifications of such definitions are incorporated in the scope of the disclosure.

Application Example 1

A description will be given of an example in which metadata is further used in the data element presentation method S1 according to the present embodiment. If data to be referred to by the computer 1 is EML data, metadata (for example, a subject, a destination, a date and time, and the like) other than text data constituting body text can be further used. For example, text data constituting the subject can be processed similarly to the text data constituting the body text.

Moreover, the "destination" such as an e-mail address or an address of the target EML data is tagged separately from the body text, and the "destination" is associated with each of a plurality of cooccurrence data elements selected from the body text of the target EML data in the selection processing S12 of the data element presentation method S1. In the sorting processing S14, the cooccurrence data elements and the "destination" associated with each of the cooccurrence data elements are presented in a list including the cooccurrence data elements. Thus, a user can confirm the "destination" related to each cooccurrence data element. Moreover, a specific "destination" can be deemed important, based on the frequencies of appearances of the "destinations" associated with the cooccurrence data elements listed on the list in the sorting processing S14.

The "date and time" of the target EML data is a date and time of sending or receiving an e-mail. The "date and time" of the target EML data is tagged separately from the body text, and the "date and time" is associated with each of the plurality of cooccurrence data elements selected from the body text of the target EML data in the selection processing S12 of the data element presentation method S1. When the number of appearances or the frequency of appearances (tf) of each cooccurrence data element is calculated in the calculation processing S13, the controller 12 may sort the cooccurrence data elements in order of the dates and times associated with the cooccurrence data elements, respectively. Moreover, a date-and-time range in which each cooccurrence data element appears may be presented. For example, target text to be searched for a key word may be narrowed down based on the date-and-time range in which a certain cooccurrence data element appears.

Application Example 2

A description will be given of an example in which text data is presented to the user in the data element presentation method S1 according to the present embodiment. The controller 12 presents only the cooccurrence data elements selected in the selection processing S12 to the user in the present embodiment, but may further present text data including the selected cooccurrence data elements to the user. For example, the controller 12 firstly assigns a label to each cooccurrence data element selected in the selection processing S12 based on a property or the like of the cooccurrence data element. The property indicates a character, a category, and the like of the cooccurrence data element, such as, for example, "client", "cartel-related company", or "cartel-related party". Next, the controller 12 searches for text data including more cooccurrence data elements assigned labels and presents the text data to the user. By presenting text data including more cooccurrence data elements assigned specific labels to the user, the user can efficiently find text data to pick up.

It is highly possible that the text data including the more cooccurrence data elements assigned the specific labels includes a data element for the user to pick up, other than the data elements presented as the cooccurrence data elements. Thus, the user can efficiently find the important data element to pick up, other than the presented cooccurrence data elements. In such a case, the data element determined to be important by the user may be added as a new key element and further used in screening.

Modification Example

In the present embodiment, a description is given of the data element presentation method S1 in which a list including data elements that complement a predetermined key element is generated by referring to the sets of data D including sets of data that meet a specific extraction condition. However, the disclosure is not limited to such a data element presentation method. That is, a data element presentation method in which a list of data elements that complement a predetermined key element is generated by referring to sets of data D' including sets of data that do not meet the extraction condition, in addition to the sets of data D including the sets of data that meet the extraction condition (hereinafter, referred to as the data element presentation method S1') is also incorporated in the scope of the disclosure. Here, designating a set of data that meets the extraction condition will be referred to as "tagging". Moreover, a set of data that meets the extraction condition will be referred to as a "tagged set of data", and a set of data that does not meet the extraction condition will be referred to as an "untagged set of data".

The data element presentation method S1' according to the present modification example includes storing processing S10', filtering processing S11', selection processing S12', calculation processing S13', sorting processing S14', and presentation processing S15', similarly to the above-described data element presentation method S1.

The storing processing S10' is processing of storing the sets of data D and the sets of data D' in the memory 11 of the computer 1. The filtering processing S11' is processing of eliminating predetermined data elements that are deemed unlikely to be key elements, from each set of data included in the sets of data D. The selection processing S12' is processing of selecting, as a cooccurrence data element or cooccurrence data elements, a data element or data elements existing in vicinity of a data element given as a key element in each set of data subjected to the filtering processing S11'. The calculation processing S13' is processing of calculating a degree of importance of each cooccurrence data element selected in the selection processing S12', based on the number of appearances of the cooccurrence data element in each set of data included in the sets of data D and the sets of data D'. The sorting processing S14' is processing of sorting a list including the cooccurrence data elements selected in the selection processing S12' in order according to the degrees of importance W(t) calculated in the calculation processing S13'. The presentation processing S15' is processing of presenting to a user a list of the cooccurrence data elements sorted in the sorting processing S14', as a list of the data elements that complement the given key element arranged in order of the degrees of importance.

Hereinafter, a specific example of the data element presentation method S1' according to the present modification example will be described with reference to FIG. 4. Here, a description will be given of a method in which a list of morphemes (data elements) that complement a key word (key element) "A corporation" is generated when the sets of data D including five tagged sets of data Doc_1 to Doc_5 and the sets of data D' including three untagged sets of data Doc_6 to Doc_8 are stored in the memory 11 in the storing processing S10'.

In the filtering processing S11', morphemes other than proper nouns, numbers, alphabetical letters, and unknown words are eliminated from each tagged set of data d (d=Doc_1, Doc_2, Doc_3, Doc_4, Doc_5). FIG. 4 illustrates the text set of data Doc_1 from which such morphemes are eliminated, with morphemes "Yamaguchi", "Mr.", "A corporation", "Z corporation", "Z corporation", "A corporation", . . . remaining.

In the selection processing S12', a morpheme or morphemes existing in vicinity of the key word "A corporation" in each tagged set of data d subjected to the filtering processing S11' are selected as a cooccurrence data element or cooccurrence data elements. FIG. 4 shows that in the text set of data Doc_1 subjected to the filtering processing S11', the morphemes "Mr." and "Z corporation" existing in vicinity of the key word "A corporation" are selected as cooccurrence data elements. In FIG. 4, other cooccurrence data elements than "Mr." and "Z corporation" are cooccurrence data elements selected from the other text sets of data than the text set of data Doc_1. Note that in the present specific example, a morpheme at a distance of 1 or shorter from the key word "A corporation" is defined as a morpheme existing in vicinity of the key word "A corporation".

In the calculation processing S13', the degree of importance W(t) of each cooccurrence data element t (t="notice", "Mr.", "Z corporation", "investigation", "Shimbashi") selected in the selection processing S12' is calculated based on the number of appearances $n_{s,d}$ of each cooccurrence data element t in each text set of data d.

The calculation processing S13' is performed as follows.

First, for each cooccurrence data element t selected in the selection processing S12', the number of appearances $n_{s,d}$ in each text set of data d included in the sets of data D is counted. A cooccurrence matrix $n_{s,d}$ based on the numbers of appearances $n_{s,d}$ here is the same as the cooccurrence matrix shown in Table 1.

In the present example, for each cooccurrence data element t selected in the selection processing S12', the number of appearances $n_{s,d'}$ in each untagged set of data d' (d'=Doc_6, Doc_7, Doc_8) included in the sets of data D' is also counted. Here, the number of appearances can be counted by, for example, searching each untagged set of data d' for the key word.

Next, for each cooccurrence data element t selected in the selection processing S12', tf(t, d) in each text set of data d included in the sets of data D is calculated in accordance with the above-mentioned equation (1). The calculated tf(t, d) is the same as those in Table 2 in the embodiment. For example, the total number of appearances of the cooccurrence data elements in the text set of data Doc_1 is 3 (1 appearance of "Mr." and 2 appearances of "Z corporation"), and the number of appearances $n_{Mr.,Doc\_1}$ of the cooccurrence data element "Mr." in the text set of data Doc_1 is 1. Accordingly, tf(Mr., Doc_1) is ⅓.

Next, for each cooccurrence data element t selected in the selection processing S12', df(t) is counted. In the present example, df(t) is the number of text sets of data including a cooccurrence data element t, among the text sets of data Doc_1 to Doc_5 included in the sets of data D and the text sets of data Doc_6 to Doc_8 included in the sets of data D'.

The present example is different from the embodiment in that the number of the text sets of data Doc_6 to Doc_8 that include a cooccurrence data element t is used. For example, if "Mr." appears one time in each of Doc_6 to Doc_8, text sets of data including "Mr." are the text sets of data Doc_6, Doc_7, and Doc_8, in a total of three text sets of data. In conjunction with results from the text sets of data Doc_1 to Doc_5, df(Mr.) of "Mr." is 7. In the present example, df(t) is counted as in Table 7 below.

TABLE 7

| | df(t) | | | | |
|---|---|---|---|---|---|
| | notice | Mr. | Z corporation | investigation | Shimbashi |
| df(t) | 3 | 7 | 4 | 5 | 4 |

Next, for each cooccurrence data element t selected in the selection processing S12', idf(t) is calculated in accordance with the above-mentioned equation (2). If df(t) is as in Table 7 above, idf(t) is calculated as in Table 8 below. For example, the text sets of data included in the sets of data D are the text set of data Doc_1, the text set of data Doc_2, the text set of data Doc_3, the text set of data Doc_4, and the text set of data Doc_5, in a total of 5 text sets of data, and the text sets of data included in the sets of data D' are the text set of data Doc_6, the text set of data Doc_7, and the text set of data Doc_8, in a total of 3 text sets of data. The number of all of the text sets of data is 8, and df(Mr.) is 7. Accordingly, idf(Mr.) is log(8/7)+1≈1.058.

TABLE 8

| | idf(t) | | | | |
|---|---|---|---|---|---|
| | notice | Mr. | Z corporation | investigation | Shimbashi |
| idf(t) | 1.3010 | 1.0580 | 1.3010 | 1.2041 | 1.3010 |

Next, for each cooccurrence data element t selected in the selection processing S12', TF·IDF(t, d) in each text set of data d is calculated in accordance with the above-mentioned equation (3). If the cooccurrence matrix $n_{s,d}$ is as in Table 1 above, TF·IDF(t, d) is calculated as in Table 9 below. For example, tf(Mr., Doc_1) is ⅓, and idf(Mr.) is 1.058. Accordingly, TF·IDF(Mr., Doc_1) is ⅓×1.058≈0.3527.

TABLE 9

| | TF•IDF(t, d) | | | | |
|---|---|---|---|---|---|
| | notice | Mr. | Z corporation | investigation | Shimbashi |
| Doc_1 | 0.0000 | 0.3527 | 0.8674 | 0.0000 | 0.0000 |
| Doc_2 | 0.2168 | 0.1703 | 0.2168 | 0.2007 | 0.4337 |
| Doc_3 | 0.0000 | 0.3527 | 0.8674 | 0.0000 | 0.0000 |
| Doc_4 | 0.0000 | 0.3537 | 0.0000 | 0.4014 | 0.4337 |
| Doc_5 | 0.9758 | 0.0000 | 0.3253 | 0.0000 | 0.0000 |

Lastly, for each cooccurrence data element t selected in the selection processing S12', the degree of importance W(t) is calculated. As described above, the degree of importance W(t) is defined by, for example, the sum of TF·IDF(t, d), $\Sigma_{d \in D}$ TF·IDF(t, d). If the cooccurrence matrix $n_{s,d}$ is as in Table 1 above, the degrees of importance W(t) are calculated as in Table 10 below. For example, TF·IDF(Mr., Doc_1) is 0.3527, TF·IDF(Mr., Doc_2) is 0.1763, TF·IDF(Mr., Doc_3) is 0.3527, TF·IDF(Mr., Doc_4) is 0.3527, and TF·IDF(Mr., Doc_5) is 0. Accordingly, the degree of importance W(Mr.) is 0.3527+0.1763+0.3527+0.3527+0=1.2343.

TABLE 10

| | Degree of importance W | | | | |
|---|---|---|---|---|---|
| | notice | Mr. | Z corporation | investigation | Shimbashi |
| Degree of importance | 1.1926 | 1.2343 | 2.2768 | 0.6021 | 0.8674 |

In the sorting processing S14', a list of the cooccurrence data elements {notice, Mr., Z corporation, investigation, Shimbashi} selected in the selection processing S12' is sorted in order according to the degrees of importance W(t) calculated in the calculation processing S13'. If the degrees of importance W(t) are as in Table 10 above, a list of the cooccurrence data elements sorted in order according to the degrees of importance W(t) is {Z corporation, Mr., notice, Shimbashi, investigation}.

The list of the cooccurrence data elements sorted in the embodiment is {Z corporation, notice, Mr., Shimbashi, investigation}, while the list of the cooccurrence data elements sorted in the present modification example is {Z corporation, Mr., notice, Shimbashi, investigation}.

FIGS. 5A and 5B show bar graphs indicating the degree of importance W of each morpheme. FIG. 5A shows a case where the degrees of importance W are calculated by using only the tagged sets of data d included in the sets of data D, and FIG. 5B shows a case where the degrees of importance W are calculated by using the tagged sets of data d included in the sets of data D and the untagged sets of data d' included in the sets of data D'. FIG. 5A corresponds to the degree of importance W of each morpheme calculated in the embodiment, and FIG. 5B corresponds to the degree of importance W of each morpheme calculated in the present modification example.

As shown in FIGS. 5A and 5B, the degree of importance W of "Z corporation" in FIG. 5B is higher than that of FIG. 5A. This reflects a fact that "Z corporation" appears only in the tagged sets of data d and does not appear in the untagged sets of data d'. That is, it can be said that "Z corporation" is a characteristic morpheme that appears only in the tagged sets of data d.

As shown in FIGS. 5A and 5B, conversely, the degree of importance W of "investigation" in FIG. 5B is lower than that of FIG. 5A. This reflects a fact that "investigation" appears in both the tagged sets of data d and the untagged sets of data d'. That is, it can be said that "investigation" is an uncharacteristic morpheme that appears across all text sets of data, not limited to the tagged sets of data d.

As described above, by increasing the number of text sets of data used in processing, the degree of importance of a morpheme can be calculated further preferably, and an important morpheme can be extracted.

OTHER APPLICATION EXAMPLES

As described above, the computer, the data element presentation method, and the program according to the disclosure are described as specific examples of presenting data elements that complement a given key element. However, the disclosure is not limited to such examples. The computer, the data element presentation method, and the program according to the disclosure can be broadly applied to work of narrowing down sets of data (i.e., "information search") by using a key element designated by a user in order to extract specific data from among a large amount of data.

(Supplementary Note)

The disclosure is not limited to each embodiment described above, but various changes can be made within the scope of claims. Any embodiments obtained by appropriately combining the respective technical means disclosed in the different embodiments are also incorporated in the technical scope of the disclosure. Further, a new technical feature can be formed by combining the respective technical means disclosed in the embodiments.

This application claims the benefit of foreign priority to Japanese Patent Applications No. JP2018-189371, filed Oct. 4, 2018, which is incorporated by reference in its entirety.

What is claimed is:

1. A computer comprising a memory and a controller, wherein the memory stores sets of data including a plurality of sets of data, and
the controller performs
selection processing of selecting, as a cooccurrence data element or cooccurrence data elements, at least one data element existing in vicinity of a predetermined data element in each set of data included in the sets of data,
calculation processing of calculating a degree of importance of each cooccurrence data element selected in the selection processing, based on a number of appearances of the cooccurrence data element in each set of data included in the sets of data, and
presentation processing of presenting, to a user, the cooccurrence data elements selected in the selection processing, according to the degrees of importance calculated in the calculation processing.

2. The computer according to claim 1, wherein the controller further performs
sorting processing of sorting the cooccurrence data elements selected in the selection processing in order according to the degrees of importance calculated in the calculation processing.

3. The computer according to claim 1, wherein the controller further performs
extraction processing of extracting, using the predetermined data element and all or part of the data elements selected in the selection processing as key elements, data including the key elements from the sets of data or other sets of data than the sets of data.

4. The computer according to claim 3, wherein the controller further performs
reception processing of receiving a user operation for selecting a data element to be used as a key element from among the cooccurrence data elements selected in the selection processing, and
in the extraction processing, using the predetermined data element and the data element selected by the user in the reception processing as key elements, data including the key elements is extracted from the sets of data or the other sets of data than the sets of data.

5. The computer according to claim 3, wherein the extraction processing adds the data elements selected in the selection processing to a key element so as to reduce a possibility of absence of data that meets a predetermined extraction condition from an extraction result.

6. The computer according to claim 1, wherein the calculation processing includes, for each cooccurrence data element selected in the selection processing, (1) counting the number of appearances of the cooccurrence data element in each set of data included in the sets of data, (2) counting a number of sets of data including the cooccurrence data element among the sets of data included in the sets of data, and (3) calculating the degree of importance of the cooccurrence data element, based on the number of appearances and the number of sets of data.

7. The computer according to claim 1, wherein the memory stores a first sets of data including a plurality of sets of data that meet a specific condition and a second sets of data including a plurality of sets of data that do not meet the specific condition, and the calculation processing includes, for each cooccurrence data element selected in the selection processing, (1) counting the number of appearances of the cooccurrence data element in each set of data included in the first sets of data, (2) counting a number of sets of data including the cooccurrence data element among the sets of data included in the first sets of data and the sets of data included in the second sets of data, and (3) calculating the degree of importance of the cooccurrence data element, based on the number of appearances and the number of sets of data.

8. The computer according to claim 1, wherein each of the data elements is a morpheme, and each of the sets of data is a string of morphemes.

9. A data element presentation method of presenting data elements that complement a predetermined data element to a user by using a computer including a memory and a controller, comprising:

storing processing of storing sets of data including a plurality of sets of data in the memory;

selection processing, by the controller, of selecting, as a cooccurrence data element or cooccurrence data elements, at least one data element existing in vicinity of the predetermined data element in each set of data included in the sets of data including the plurality of sets of data;

calculation processing, by the controller, of calculating a degree of importance of each cooccurrence data element selected in the selection processing, based on a number of appearances of the cooccurrence data element in each set of data included in the sets of data; and presentation processing, by the controller, of presenting, to the user, each cooccurrence data element selected in the selection processing, according to the degree of importance calculated in the calculation processing.

* * * * *